United States Patent
Luo et al.

(10) Patent No.: US 10,279,339 B2
(45) Date of Patent: May 7, 2019

(54) INTEGRATED SYSTEM TO CONTINUOUSLY INJECT SMALL AMOUNTS OF IMMISCIBLE LIQUID

(71) Applicant: Chevron U.S.A. Inc., San Ramon, CA (US)

(72) Inventors: Huping Luo, Moraga, CA (US); Gordon R. Deppe, Clayton, CA (US); Albert Eugene Butterfield, Novato, CA (US); Allison Amy Evans, Richmond, CA (US); Jacob Fritz, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/341,031

(22) Filed: Nov. 2, 2016

(65) Prior Publication Data

US 2018/0117575 A1    May 3, 2018

(51) Int. Cl.
*B01F 15/00* (2006.01)
*B01F 3/08* (2006.01)
(Continued)

(52) U.S. Cl.
CPC ........... *B01J 31/0284* (2013.01); *B01F 3/088* (2013.01); *B01F 3/0865* (2013.01);
(Continued)

(58) Field of Classification Search
None
See application file for complete search history.

(56) References Cited

U.S. PATENT DOCUMENTS 6,705,358 B1 *   3/2004   Tortorici, Jr. ......... B01F 3/0865
                                                      137/268
6,848,458 B1     2/2005   Shrinivasan et al.
(Continued)

FOREIGN PATENT DOCUMENTS

JP            2005530008 A     10/2005

OTHER PUBLICATIONS

"Chemical Injection & Sampling Equipment," Product data sheet from Cormon, http://www.corrscience.com/wp-content/uploads/2011/04/Injection-Quills.pdf accessed on Dec. 6, 2017 (Year: 2011).*
(Continued)

*Primary Examiner* — Colin W. Slifka
(74) *Attorney, Agent, or Firm* — Susan M. Abernathy; Terrence M. Flaherty; E. Joseph Gess

(57) ABSTRACT

An integrated system comprising:
a. an additive delivery system comprising a transfer drum that feeds an immiscible liquid stream towards one or more injection quills;
b. a solvent flushing system, comprising one or more additive addition lines that transfer the immiscible liquid stream from the additive delivery system; and
c. an additive injection and mixing system comprising the one or more injection quills, wherein the immiscible liquid stream is injected into a larger liquid stream. Also, a process comprising:
a. feeding the immiscible liquid stream to a transfer drum;
b. transferring the immiscible liquid stream from the transfer drum to injection quills in a solvent flushing system, wherein the solvent flushing system injects a solvent into one or more additive addition lines in the solvent flushing system; and
(Continued)

c. injecting the immiscible liquid stream into the larger liquid stream in an additive injection and mixing system comprising injection quills.

12 Claims, 4 Drawing Sheets

(51) Int. Cl.
    *B01F 5/04*           (2006.01)
    *B01J 31/02*        (2006.01)

(52) U.S. Cl.
    CPC ...... *B01F 5/0486* (2013.01); *B01F 15/00025* (2013.01); *B01F 2215/0036* (2013.01); *B01J 2231/32* (2013.01)

(56) References Cited

U.S. PATENT DOCUMENTS

| | | |
|---|---|---|
| 7,285,698 B2 | 10/2007 | Liu et al. |
| 7,432,408 B2 | 10/2008 | Timken et al. |
| 7,432,409 B2 | 10/2008 | Elomari et al. |
| 7,495,144 B2 | 2/2009 | Elomari |
| 7,531,707 B2 | 5/2009 | Harris et al. |
| 7,923,593 B2 | 4/2011 | Hommeltoft et al. |
| 8,293,962 B2 | 10/2012 | Hommeltoft et al. |
| 8,674,159 B2 | 3/2014 | Hommeltoft |
| 2007/0178474 A1* | 8/2007 | Cracauer ............ B01J 19/0046 435/6.11 |

OTHER PUBLICATIONS http://www.corrscience.com/wp-content/uploads/2011/04/Injection-Quills.pdf.

\* cited by examiner

INTEGRATED SYSTEM TO CONTINUOUSLY INJECT SMALL AMOUNTS OF IMMISCIBLE LIQUID

TECHNICAL FIELD

This application is directed to an integrated system for injecting an immiscible liquid stream into a larger liquid stream and a process for injecting the immiscible liquid stream into the larger liquid stream.

BACKGROUND

Improved processes and equipment are needed for continuously and reliably injecting a small immiscible liquid stream into a larger liquid stream while allowing intimate mixing between these two liquids in industrial field services.

SUMMARY

This application provides an integrated system for injecting an immiscible liquid stream into a larger liquid stream, comprising:

a. an additive delivery system comprising a transfer drum that feeds the immiscible liquid stream towards one or more injection quills;

b. a solvent flushing system, fluidly connected downstream from the additive delivery system, comprising one or more additive addition lines that transfer the immiscible liquid stream from the additive delivery system to the one or more injection quills, and wherein a solvent is injected into the one or more additive addition lines; and c. an additive injection and mixing system comprising the one or more injection quills, wherein the immiscible liquid stream is injected into the larger liquid stream.

This application also provides a process for injecting an immiscible liquid stream into a larger liquid stream, comprising:

a. feeding the immiscible liquid stream towards one or more injection quills in an additive delivery system comprising a transfer drum;

b. transferring the immiscible liquid stream from the additive delivery system to the one or more injection quills in a solvent flushing system, fluidly connected downstream from the additive delivery system, wherein the solvent flushing system injects a solvent into one or more additive addition lines in the solvent flushing system; and c. injecting the immiscible liquid stream into the larger liquid stream in an additive injection and mixing system comprising the one or more injection quills.

The present invention may suitably comprise, consist of, or consist essentially of, the elements in the claims, as described herein.

GLOSSARY

Figure 1:
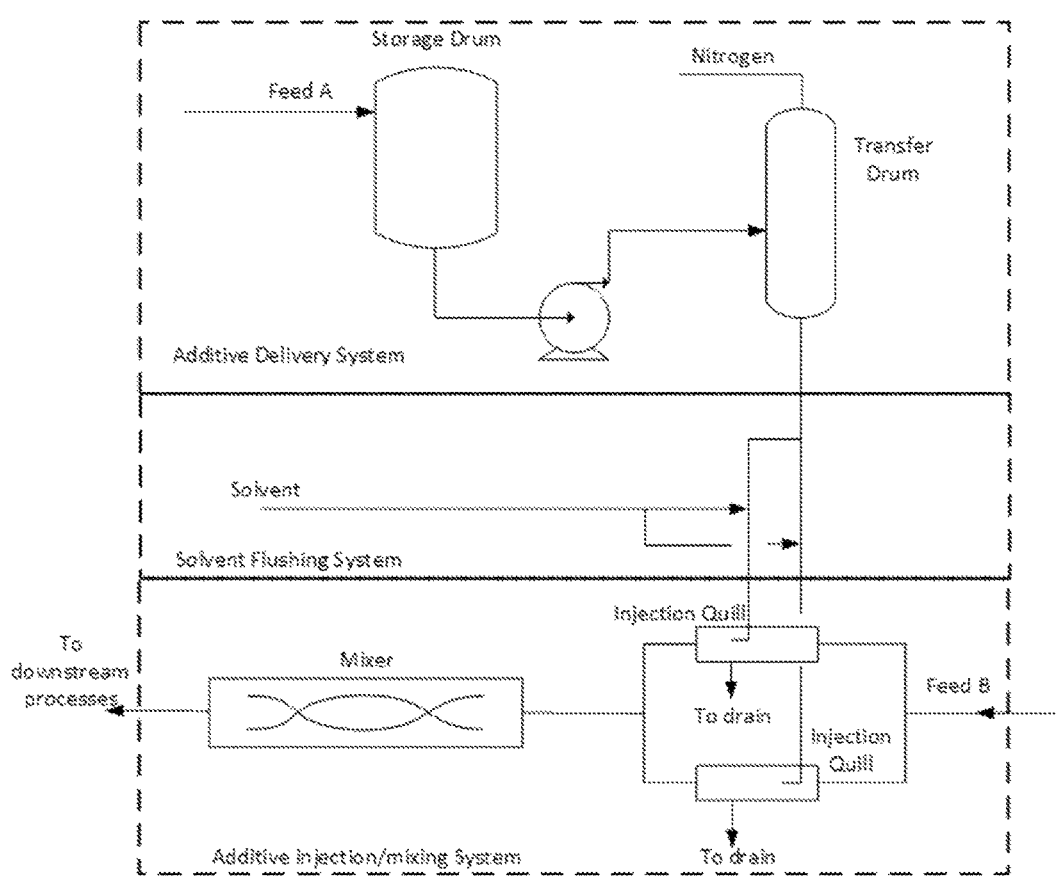
FIG. 1 is a drawing of one example of an integrated system of this invention.

An "immiscible liquid" is a liquid that does not mix to form a homogeneous mixture with another liquid. Examples of immiscible liquids are oil and water, hydrocarbons and acidic ionic liquids, or pentane and acetic acid.

An "injection quill" is a hollow shaft that is used to feed a liquid in mechanical devices or chemical processes.

"Acidic ionic liquid" refers to a material consisting entirely of ions, that can donate a proton or accept an electron pair in reactions, and that is liquid below 100° C.

A "transfer drum" is a container designed to hold and feed a liquid at a stable pressure in an integrated system. The transfer drum can be any shape, such as a column, a cube, an L-shape or a rectangle.

A "storage drum" is a container that is used to store a liquid in an integrated system. Like the transfer drum, it can be any suitable shape.

A "pump" is a device that moves fluids (liquids or gases), or sometimes slurries, by mechanical action. Pumps can be classified into three major groups according to the method they use to move the fluid: direct lift, displacement, and gravity.

A "diaphragm pump" refers to a positive displacement pump that uses a combination of the reciprocating action of a flexible (e.g., rubber, thermoplastic, or Teflon) diaphragm and suitable valves on either side of the diaphragm (e.g., check valves, butterfly valves, flap valves, or any other form of shut-off valves) to pump a fluid.

"Periodic Table" refers to the version of the IUPAC Periodic Table of the Elements dated Jun. 22, 2007, and the numbering scheme for the Periodic Table Groups is as described in Chemical And Engineering News, 63(5), 27 (1985).

DETAILED DESCRIPTION

The integrated system comprises an additive delivery system comprising a transfer drum that feeds an immiscible liquid stream towards one or more injection quills. In one embodiment, the immiscible liquid stream comprises an additive that produces an effect in downstream operations when the additive is mixed with the larger liquid stream.

The transfer drum is designed to maintain a steady pressure and deliver a small and stable quantity of the immiscible liquid stream continuously and reliably. In one embodiment, a stable pressure is maintained in the transfer drum and enables a steady stream of an additive to downstream operations. By stable pressure is meant that the pressure does not vary by more than 50%. In some embodiments, the stable pressure varies from zero to less than 10%.

In one embodiment, the transfer drum comprises an inlet that introduces a gas that maintains a pressure in the transfer drum. In one embodiment, the pressure in the transfer drum, for example, can be maintained at between 200 kpa to 45,000 kpa. In one embodiment, the pressure in the transfer drum is sufficiently higher than a system pressure on an exit side of the one or more injection quills to deliver the small and stable quantity of the immiscible liquid stream reliably. In one embodiment, the pressure difference between the transfer drum and the system pressure on the exit side of the one or more injection quills is at least 50% higher than a required hydraulic head. For example, the pressure difference can be from 60% to 500% higher than the required hydraulic head.

In one embodiment, the gas that is introduced into the transfer drum is inert and does not react with the either the immiscible liquid stream or the larger liquid stream. In one embodiment, the gas does not react during downstream operations that are fed by the additive injection and mixing system. Examples of gases that could be used include argon, helium, hydrogen, nitrogen, ethane, propane, butane, or neon. In one embodiment, the gas is dried to remove water prior to introduction into the transfer drum. The gas can be dried to contain 0 to 10 wppm water, for example.

In one embodiment, the integrated system (or installed components thereof) is dried before putting it into operation. In one embodiment, any (or all) of the liquids that flow through the integrated system can be dried. For example, the immiscible liquid stream, the larger liquid stream, or the solvent can be dried to contain from 0 to 10 wppm.

In one embodiment, the additive delivery system additionally comprises a storage drum that is connected via a pump to the transfer drum. In one embodiment, the storage drum has additive feeds unloaded into it and the additive feeds are stored within it. In one embodiment, the storage drum does not maintain a steady pressure.

In one embodiment, the immiscible liquid stream comprises an additive, and the pump supplies an additive flow rate that meets the needs of a downstream operation where the additive is used. In one embodiment, the pump is a positive displacement pump. In one embodiment, the pump is centrifugal pump. In one embodiment, the pump supplies an additive flow rate less than 100 cc/min, such as from 1 to 60 cc/min. In one embodiment, the pump supplies an additive flow rate that provides a weight ratio of the larger liquid stream to the immiscible liquid stream in the mixing system that is greater than 500:1, such as from 550:1 to 2000:1, or about 1000:1.

In one embodiment, the integrated system comprises a flow controller that meters an amount of an additive that is fed from the additive delivery system towards the one or more injection quills. One or more flow controllers may be used between the pump and the transfer drum or between the transfer drum and the one or more injection quills.

In one embodiment, the integrated system comprises one or more level controls to ensure sufficient and steady supply of the immiscible liquid stream. Level controls may be used, for example, in either or both of the storage drum and the transfer drum.

Figure 2:
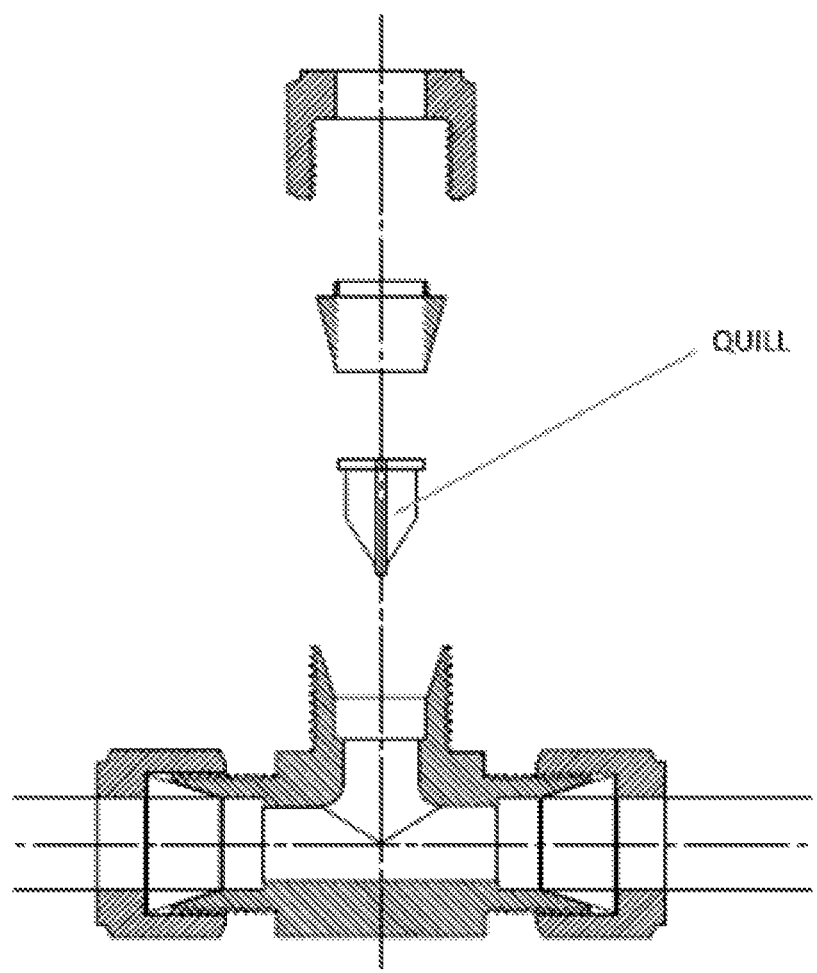
FIG. 2 is an assembly drawing of one embodiment of an injection quill.

The integrated system feeds the immiscible liquid stream towards one or more injection quills. In one embodiment the one or more injection quills are configured to provide an elevated injection flow velocity, such as greater than 30 mm/s. In one embodiment, the one or more injection quills are configured to provide an injection flow velocity of from 30 to 1000 mm/s. One example of a suitable design of the injection quills is shown in FIG. 2. In one embodiment, the injection quills are conical in shape and can be seated into one or more tee connectors that feed the immiscible liquid stream into the larger liquid stream.

In one embodiment, the one or more injection quills increase an injection flow velocity of the immiscible liquid stream, which prevents plugging and provides mixing of the immiscible liquid stream and the larger liquid stream. The injection flow velocity of the immiscible liquid stream, for example, can be increased by 10% to 10,000%. In one embodiment, an injection flow velocity of the immiscible liquid stream is sufficient to prevent backflow of the larger liquid stream.

In one embodiment, the one or more injection quills are sized to provide a ratio of a quantity, in liters/day, of an additive in the immiscible liquid stream to a second quantity, in liters/day, of the larger liquid stream that is from 0.001:1 to 0.1:1.

In one embodiment the one or more injection quills have an orifice diameter that is less than 10 mm, such as from 0.05 to 5 mm, or less than 3 mm.

The one or more injection quills can be independently oriented in any direction, and may even be oriented opposite each other to provide better mixing. The orientation of the one or more injection quills may be adjusted depending on the density of the immiscible liquid stream and the second density of the larger liquid stream. Adjusting the orientation based on the relative densities of the two fluids being mixed can avoid backflow of the larger liquid stream into the additive addition lines during shutdown or other no-flow operating conditions. In one embodiment, the one or more injection quills orient vertically and inject the immiscible liquid stream in a downward direction into a horizontal flow of the larger liquid stream when a density of the immiscible liquid stream is less than the second density of the larger liquid stream. In one embodiment, the one or more injection quills orient vertically and inject the immiscible liquid stream in an upward direction into a horizontal flow of the larger liquid stream when a density of the immiscible liquid stream is higher than the second density of the larger liquid stream.

In one embodiment, the injection quills induce a pressure drop at the inlet of the immiscible liquid stream into the larger liquid stream. The injection quills provide a more steady flow of the immiscible liquid stream and can also provide improved mixing of the immiscible liquid stream with the larger liquid stream.

In one embodiment, no further mixing of the immiscible liquid stream and the larger liquid stream is needed. In other embodiments, there can be additional mixing of the immiscible liquid stream and the larger liquid stream before discharging the mixture to downstream operations. The additional mixing can use any equipment that provides mixing, such as one or more of a static mixer, a vortexer, a baffle, a shaker, a nozzle, or a stirrer.

In one embodiment, a bypass line is installed around the one or more injection quills, such as between the transfer drum and either an in-line mixer or downstream operations to provide for servicing of the injection quills when needed.

In one embodiment, the one or more injection quills comprise an outlet to a drain that allows for occasional flush cleaning with the solvent.

In one embodiment, the integrated system comprises two or more additive addition lines in parallel. This feature is shown in FIG. 1. In FIG. 1, Feed A is the immiscible liquid stream and Feed B is the larger liquid stream.

In one embodiment, the solvent is injected into the one or more additive addition lines in an amount that maintains a sufficiently high injection flow velocity at tips of the one or more injection quills. For example, the injection flow velocity can be maintained at greater than 30 mm/s.

In one embodiment, the integrated system comprises one or more shut off valves between the transfer drum and the one or more injection quills such that the solvent can be supplied to the one or more additive addition lines separately from the immiscible liquid stream. When the flow of the immiscible liquid stream is stopped, the solvent can be used to flush the one or more additive addition lines or the one or more injection quills. In one embodiment, at least one of the one or more injection quills is operated in stand-by while at least another one of the one or more injection quills is active.

In one embodiment, the solvent is an inert liquid that does not react with either the immiscible liquid stream or the larger liquid stream. In one embodiment, the solvent is miscible with the immiscible liquid stream and is moisture-free. In one embodiment, the solvent does not introduce any reactive species that would interfere with downstream operations. In one embodiment, the solvent is a liquid hydrocarbon, such as butane, isobutane, pentane, heptane, or a mixture thereof.

In one embodiment, the immiscible liquid stream comprises a co-catalyst for a hydrocarbon conversion. In one embodiment, the immiscible liquid stream comprises an alkyl halide additive that is a co-catalyst that functions as a catalyst promoter in a downstream operation. In one embodiment, the co-catalyst is an alkyl halide. In one embodiment, the downstream operation includes a hydrocarbon conversion by an acidic ionic liquid catalyst. The use of alkyl halide additives as promoters in ionic liquid catalyzed hydrocarbon conversions is described in U.S. Pat. Nos. 7,495,144, 7,531,707, 8,293,962, and 8,674,159. Examples of hydrocarbon conversions that may be promoted by an alkyl halide additive include: isoparaffin alkylation, paraffin isomerization, olefin oligomerization, cracking of olefins or paraffins, and aromatic alkylation. An alkyl halide additive can boost the overall acidity and change the product selectivity of a hydrocarbon conversion that uses an ionic liquid catalyst. It is believed that the alkyl halide decomposes under hydroconversion conditions to liberate Bronsted acids or hydrogen halides, such as hydrochloric acid or hydrobromic acid. These Bronsted acids or other hydrogen halides promote conversion reactions. In one embodiment the alkyl halide comprises one or more halogen atoms. Examples of alkyl halides are alkyl chloride, alkyl bromide, alkyl iodide, alkyl fluoride, and mixtures thereof. The alkyl halide additive may comprise one or more different alkyl halides.

In one embodiment, the halide in the alkyl halide is the same as a halide component of the larger liquid stream. For example, the alkyl halide may be an alkyl chloride when the larger liquid stream comprises a chloroaluminate ionic liquid.

In one embodiment, the alkyl portion of the alkyl halide additive has the same chemical structure as the hydrocarbons that are in a feed stream of a downstream conversion process. Some examples of alkyl halides that can be used include: isopentyl halides, isobutyl halide, 1-butyl halide, 2-butyl halide, t-butyl halide, propyl halides, ethyl halides and other alkyl halides having from 1 to 8 carbon atoms.

In one embodiment, the alkyl halide comprises more than one halogen atom, and examples of these alkyl halides include: dichloromethane, trichloromethane, tetrachloromethane, 1,1,1-trichloroethane, and tetrachloroethylene.

In one embodiment, the larger liquid stream is an acidic ionic liquid or, more specifically, an acidic ionic liquid catalyst.

Acidic Ionic Liquids:

The most common acidic ionic liquids are those prepared from organic-based cations and inorganic or organic anions. Ionic liquid catalysts are used in a wide variety of reactions, including Friedel-Crafts reactions.

The acidic ionic liquid is composed of at least two components which form a complex. The acidic ionic liquid comprises a first component and a second component. The first component of the acidic ionic liquid will typically comprise a Lewis acid compound selected from components such as Lewis acid compounds of Group 13 metals, including aluminum halides, alkyl aluminum dihalides, gallium halide, and alkyl gallium halide (see the Periodic Table, which defines the elements that are Group 13 metals). Other Lewis acid compounds besides those of Group 13 metals may also be used. In one embodiment the first component is aluminum halide or alkyl aluminum dihalide. For example, aluminum trichloride ($AlCl_3$) may be used as the first component for preparing the ionic liquid catalyst. In one embodiment, the alkyl aluminum dihalides that can be used can have the general formula $Al_2X_4R_2$, where each X represents a halogen, selected for example from chlorine and bromine, each R represents a hydrocarbyl group comprising 1 to 12 atoms of carbon, aromatic or aliphatic, with a branched or a linear chain. Examples of alkyl aluminum dihalides include dichloromethylaluminum, dibromomethylaluminum, dichloroethylaluminum, dibromoethylaluminum, dichloro n-hexylaluminum, dichloroisobutylaluminum, either used separately or combined.

The second component making up the acidic ionic liquid is an organic salt or mixture of salts. These salts may be characterized by the general formula $Q^+A^-$, wherein $Q^+$ is an ammonium, phosphonium, boronium, oxonium, iodonium, or sulfonium cation and $A^-$ is a negatively charged ion such as $Cl^-$, $Br^-$, $ClO_4^-$, $NO_3^-$, $BF_4^-$, $BCl_4^-$, $PF_6^-$, $SbF_6^-$, $AlCl_4^-$, $Al_2Cl_7^-$, $Al_3Cl_{10}^-$, $GaCl_4^-$, $Ga_2Cl_7^-$, $Ga_3Cl_{10}^-$, $AsF_6^-$, $TaF_6^-$, $CuCl_2^-$, $FeCl_3^-$, $AlBr_4^-$, $Al_2Br_7^-$, $Al_3Br_{10}^-$, $SO_3CF_3^-$, and 3-sulfurtrioxyphenyl. In one embodiment the second component is selected from those having quaternary ammonium halides containing one or more alkyl moieties having from about 1 to about 9 carbon atoms, such as, for example, trimethylammonium hydrochloride, methyltributylammonium, 1-butyl pyridinium, or alkyl substituted imidazolium halides, such as for example, 1-ethyl-3-methyl-imidazolium chloride.

In one embodiment, the acidic ionic liquid comprises a monovalent cation selected from the group consisting of a pyridinium ion, an imidazolium ion, a pyridazinium ion, a pyrazolium ion, an imidazolinium ion, a imidazolidinium ion, an ammonium ion, a phosphonium ion, and mixtures thereof. Examples of possible cations ($Q^+$) include a butylethylimidazolium cation [beim], a butylmethylimidazolium cation [bmim], butyldimethylimidazolium cation [bmmim], decaethylimidazolium cation [dceim], a decamethylimidazolium cation [dcmim], a diethylimidazolium cation [eeim], dimethylimidazolium cation [mmim], an ethyl-2,4-dimethylimidazolium cation [e-2,4-mmim], an ethyldimethylimidazolium cation [emmim], an ethylimidazolium cation [eim], an ethylmethylimidazolium [emim] cation, an ethylpropylimidazolium cation [epim], an ethoxyethylmethylimidazolium cation [etO-emim], an ethoxydimethylimidazolium cation [etO-minim], a hexadecylmethylimidazolium cation [hexadmim], a heptylmethylimidazolium cation [hpmim], a hexaethylimidazolium cation [hxeim], a hexamethylimidazolium cation [hxmim], a hexadimethylimidazolium cation [hxmmim], a methoxyethylmethylimidazolium cation [meO-emim], a methoxypropylmethylimidazolium cation [meO-prmim], a methylimidazolium cation [mim], dimethylimidazolium cation [mmim], a methylnonylimidazolium cation [mnim], a methylpropylimidazolium cation [mpim], an octadecylmethylimidazolium cation [octadmim], a hydroxylethylmethylimidazolium cation [OH-emim], a hydroxyloctylmethylimidazolium cation [OH-omim], a hydroxylpropylmethylimidazolium cation [OH-prmim], an octylmethylimidazolium cation [omim], an octyldimethylimidazolium cation [ommim], a phenylethylmethylimidazolium cation [ph-emim], a phenylmethylimidazolium cation [ph-mim], a phenyldimethylimidazolium cation [ph-minim], a pentylmethylimidazolium cation [pnmim], a propylmethylimidazolium cation [prmim], a 1-butyl-2-methylpyridinium cation[1-b-2-mpy], 1-butyl-3-methylpyridinium cation[1-b-3-mpy], a butylpyridinium [bmpy] cation, a 1-butyl-4-dimethylacetylpyridinium cation [1-b-4-DMApy], a 1-butyl-4-methylpyridinium cation[1-b-4-mpy], a 1-ethyl-2-methylpyridinium cation[1-e-2-mpy], a 1-ethyl- 3-methylpyridinium cation[1-e-3-mpy], a 1-ethyl-4-dimethylacetylpyridinium cation[1-e-4-DMApy], a 1-ethyl-4-methylpyridinium cation[1-e-4-mpy], a 1-hexyl-4dimethylacetylpyridinium cation[1-hx-4-DMApy], a 1-hexyl-4-methylpyridinium cation[1-hx-4-mpy], a 1-octyl-3-methylpyridinium cation[1-o-3-mpy], a 1-octyl-4-methylpyridinium cation[1-o-4-mp y], a 1-propyl-3-methylpyridinium cation[1-pr-3-mpy], a 1-propyl-4-methylpyridinium cation[1-pr-4-mpy], a butylpyridinium cation [bpy], an ethylpyridinium cation [epy], a heptylpyridinium cation [hppy], a hexylpyridinium cation [hxpy], a hydroxypropylpyridinium cation [OH-prpy], an octylpyridinium cation [opy], a pentylpyridinium cation [pnpy], a propylpyridinium cation [prpy], a butylmethylpyrrolidinium cation [bmpyr], a butylpyrrolidinium cation [bpyr], a hexylmethylpyrrolidinium cation [hxmpyr], a hexylpyrrolidinium cation [hxpyr], an octylmethylpyrrolidinium cation [ompyr], an octylpyrrolidinium cation [opyr], a propylmethylpyrrolidinium cation [prmpyr], a butylammonium cation [b-N], a tributylammonium cation [bbb-N], a tetrabutylammonium cation [bbbb-N], a butylethyldimethylammonium cation [bemm-N], a butyltrimethylammonium cation [bmmm-N], a N,N,N-trimethylethanolammonium cation [choline], an ethylammonium cation [e-N], a diethylammonium cation Fee-NI, a tetraethylammonium cation [eeee-N], a tetraheptylammonium cation [hphphphp-N], a tetrahexylammonium cation [hxhxhxhx-N], a methylammonium cation [m-N], a dimethylammonium cation [mm-N], a tetramethylammonium cation [mmmm-N], an ammonium cation [N], a butyldimethylethanolammonium cation [OHe-bmm-N], a dimethylethanolammonium cation [OHe-mm-N], an ethanolammonium cation [OHe—N], an ethyldimethylethanolammonium cation [OHe-emm-N], a tetrapentylammonium cation [pnpnpnpn-N], a tetrapropylammonium cation [prprprpr-N], a tetrabutylphosphonium cation [bbbb-P], a tributyloctylphosphonium cation [bbbo-P], or combinations thereof.

In one embodiment, the second component is selected from those having quaternary phosphonium halides containing one or more alkyl moieties having from 1 to 12 carbon atoms, such as, for example, trialkyphosphonium hydrochloride, tetraalkylphosphonium chlorides, and methyltrialkyphosphonium halide.

In one embodiment, the acidic ionic liquid comprises an unsubstituted or partly alkylated ammonium ion.

In one embodiment, the acidic ionic liquid is chloroaluminate or a bromoaluminate. In one embodiment the acidic ionic liquid is a quaternary ammonium chloroaluminate ionic liquid having the general formula RR' R" N H+Al$_2$Cl$_7$—, wherein R, R', and R" are alkyl groups containing 1 to 12 carbons. Examples of quaternary ammonium chloroaluminate ionic liquids are an N-alkyl-pyridinium chloroaluminate, an N-alkyl-alkylpyridinium chloroaluminate, a pyridinium hydrogen chloroaluminate, an alkyl pyridinium hydrogen chloroaluminate, a di alkyl-imidazolium chloroaluminate, a tetra-alkyl-ammonium chloroaluminate, a tri-alkyl-ammonium hydrogen chloroaluminate, or a mixture thereof.

The presence of the first component should give the acidic ionic liquid a Lewis or Franklin acidic character. Generally, the greater the mole ratio of the first component to the second component, the greater is the acidity of the acidic ionic liquid.

For example, a typical reaction mixture to prepare n-butyl pyridinium chloroaluminate ionic liquid is shown below:

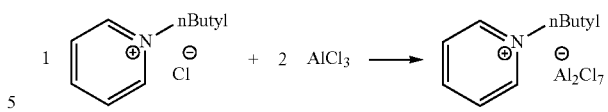

In one embodiment, the acidic ionic liquid is used as a catalyst for a hydrocarbon conversion and the hydrocarbon conversion utilizes a co-catalyst to provide enhanced or improved catalytic activity. A co-catalyst can comprise, for example, anhydrous hydrogen chloride or organic chloride (see, e.g., U.S. Pat. Nos. 7,495,144 and 7,531,707). When organic chloride is used as the co-catalyst with the acidic ionic liquid, hydrogen chloride may be formed in situ in the apparatus either during the hydrocarbon conversion process or during post-processing of the output of the hydrocarbon conversion. In one embodiment, the hydrocarbon conversion is conducted in the presence of a hydrogen halide, e.g., HCl. In one embodiment, the hydrogen chloride is recycled from a downstream operation, which reduces the amount of the organic chloride that is injected into the acidic ionic liquid to promote the acidic ionic liquid catalyst activity.

When used in a hydrocarbon conversion by an acidic ionic liquid catalyst, the alkyl halide additive or the hydrogen halide are used in catalytic amounts. In one embodiment, the amounts of the alkyl halide or hydrogen halide should be kept at low concentrations and not exceed the molar concentration of an AlCl$_3$ in the acidic ionic liquid. For example, the amounts of the alkyl halide additive or the hydrogen halide used may range from 0.001 mol % to 100 mol % of the Lewis acid (e.g., AlCl$_3$) in the acidic ionic liquid in order to keep the acidity of the acidic ionic liquid catalyst at the desired performing capacity. The amount of the alkyl halide that may be required can be a lower mol % of the Lewis acid in the acidic ionic liquid when an alkyl halide that comprises a higher wt % of halide is used. In one embodiment, the amount or type of the halide containing additive that is fed to the one or more injection quills can be adjusted to change product selectivity in downstream operations. The effective stable control and adjustments of the amounts of these immiscible liquid streams is achieved by the integrated systems and processes of this disclosure.

Hydrocarbon Conversion Using Acidic Ionic Liquids

Acidic ionic liquids can be used as catalysts for various types of hydrocarbon conversions. Examples of these hydrocarbon conversions include: an alkylation, a dimerization, an oligomerization, an acylation, a hydrocracking, a metathesis, a copolymerization, an isomerization, a carbonylation, a hydroformylation, a dehalogenation, a dehydration, a disproportionation, a transalkylation, and combinations thereof. In one embodiment, the hydrocarbon conversion is alkylation of paraffins with olefins. In another embodiment, the hydrocarbon conversion is alkylation of aromatics. Examples of ionic liquid catalysts and their use for alkylation of paraffins with olefins are taught, for example, in U.S. Pat. Nos. 7,432,408, 7,432,409, 7,285,698, and 7,923,593. In one embodiment, the acidic ionic liquid is a composite ionic liquid catalyst, wherein the cations come from a hydrohalide of an alkyl-containing amine or pyridine, and the anions are composite coordinate anions coming from two or more metal compounds. In another embodiment the conversion of a hydrocarbon is alkylation of paraffins, alkylation of aromatics, or combinations thereof.

In one embodiment, the feed to the hydrocarbon conversion comprises at least one olefin and at least one isoparaffin. For example the feed can comprise a mixture of at least one mostly linear olefin from $C_2$ to about $C_{30}$. In another embodiment, the feed can comprise at least 50% of a single alpha olefin species. In one embodiment, the olefin feed comprises at least one isomerized olefin.

In one embodiment, the feed to an alkylation reactor used for the hydrocarbon conversion by an acidic ionic liquid catalyst comprises one or more $C_4$-$C_7$ isoparaffins and one or more $C_2$-$C_5$ olefins, and the process produces an alkylate gasoline blending component.

In one embodiment, the feed to the hydrocarbon conversion comprises isobutane. In one embodiment, isopentanes, isohexanes, isoheptanes, and other higher isoparaffins up to about $C_{30}$ are also useable in the processes and integrated systems disclosed herein. Mixtures of light isoparaffins can also be used. Mixtures such as $C_3$-$C_4$, $C_3$-$C_5$, or $C_4$-$C_5$ isoparaffins can also be used and may be advantaged because of reduced separation costs.

In one embodiment, the feed to the hydrocarbon conversion can also contain diluents such as normal paraffins. This can be a cost savings by reducing the cost of separating isoparaffins from close boiling paraffins. In one embodiment, the normal paraffins will tend to be unreactive diluents in the hydrocarbon conversion.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

EXAMPLES

Figure 3:
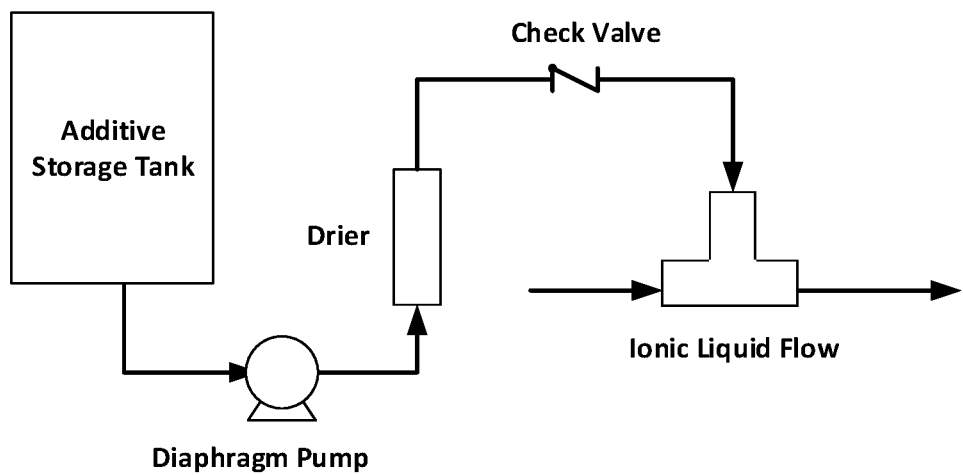
FIG. 3 is a drawing of a comparative integrated system without a transfer drum, without solvent flushing, and without injection quills.

Example 1 (Comparative): Injection of Additive into Ionic Liquid Stream with a Diaphragm Pump Via a Regular Injection Tee Fitting In a pilot plant alkylation unit using an acidic ionic liquid to make alkylate gasoline blending components, a small amount of alkyl halide additive was needed to be added to the ionic liquid stream as a co-catalyst. The ionic liquid used in the unit was comprised n-butyl pyridinium chloroaluminate ionic liquid. The ratio of a quantity, in liter/day, of the alkyl halide additive in the immiscible liquid stream to a second quantity, in liter/day, of the acidic ionic liquid stream is less than 0.08:1. Only a small flow rate of the alkyl halide additive (i.e., 3 to 15 cc/min) was needed to be added to the ionic liquid stream. The flow rate of the ionic liquid stream was considerably greater than the flow rate of the alkyl halide additive. In this example, the flow rate of the ionic liquid stream was over 200 cc/min. Due to the small flow rate of the additive, a diaphragm pump was used to deliver the additive to the ionic liquid stream. Prior to addition, the additive was flowed through a drier to remove moisture. After drying, the additive stream passed through a check valve that was used to prevent back flow of the ionic liquid into the additive line. The additive was then directly discharged to the ionic liquid stream via a regular injection tee connector. The configuration of the test unit used for this comparative example is shown in FIG. 3.

After operating for a period of time, several operating issues were observed:

1. Due to the nature of the diaphragm pump, the additive flow to the ionic liquid stream fluctuated. This resulted in a non-uniform additive concentration in the ionic liquid stream and caused poor product quality in the downstream reaction system;

2. The diaphragm pump would occasionally stop pumping, particularly during initial startup. Due to the lower pressure in the additive storage tank, when the pump stopped pumping, ionic liquid tended to back flow. Although the check valve could effectively slow down the back flow rate, it didn't fully eliminate it. Back flow of the ionic liquid in this example caused significant contamination of the entire additive injection system with the ionic liquid;

3. Although the additive was normally dried before injecting into the ionic liquid stream, moisture breakthrough in the drier bed did happen once during actual operation. This caused ionic liquid hydrolysis in the injection tee where the additive mixed with ionic liquid and eventually plugged up the additive flow line. The system was forced to shut down to clean up the lines;

4. Due to the low linear velocity of the additive stream, mixing between the additive and the ionic liquid streams were poor, resulting in non-uniform additive concentration in the ionic liquid stream and caused poor alkylate product quality in the downstream reaction system.

Figure 4:
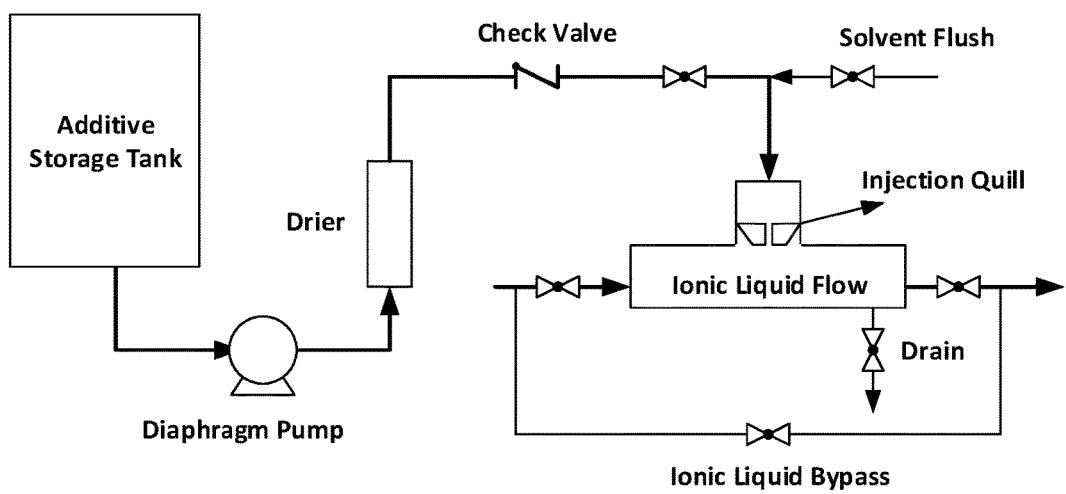
FIG. 4 is a drawing of a comparative integrated system that does not include a transfer drum.

Example 2 (Comparative): Injection of Additive into Ionic Liquid Stream with a Diaphragm Pump Via an Injection Quill As in example 1, instead of discharging the additive stream directly into the ionic liquid flow line via a regular injection tee, an injection quill with an orifice of 1.6 mm diameter was installed on the top of the injection tee to significantly increase the linear velocity of the additive stream. A solvent flush system was also added which allowed for cleaning of the injection system without the need to disconnect any lines. The configuration of the test unit used for this example is shown in FIG. 4.

Adding the injection quill and the solvent flush system significantly improved the operability of this additive injection system and significantly reduced the equipment down time. The installation of the injection quill improved the mixing between the additive stream and the ionic liquid stream, which resulted in improved uniformity of the additive in the ionic liquid stream and better product quality. The operational issues associated with the diaphragm pump (items 1 and 2 identified in Example 1) however still existed, but to a much lesser degree. Moreover, due to its small internal diameter, the injection quill was susceptible to occasional build-up of solids and was plugged up several times during extended operation. The solids that caused the plugging of the injection quill were easily flushed out by the installed solvent flush.

Example 3 (Comparative): Injection of Additive into Ionic Liquid Stream with a Quizix Pump Via an Injection Quill As in example 2, instead of using a diaphragm pump, a Quizix™ positive displacement metering pump was installed to deliver the additive flow to the ionic liquid stream. Quizix is a registered trademark of Chandler Engineering. The Quizix pump was a positive displacement pump with air-actuated valves that operated with provided software. The Quizix pump was an alternative positive displacement pump that was used successfully in the unit. The Quizix pump was able to deliver a more stable continuous pulseless flow of the additive compared to the diaphragm pump.

However, the unit was still susceptible to the occasional ionic liquid back flow issue whenever the Quizix pump was stopped. Moreover, the Quizix pump was a costly pump that is more often used in lab environments. The Quizix pump required substantial care to operate it properly. Some installation and operational issues were encountered when we operated the Quizix pump in the harsh industrial environment of the unit during the yearlong test, which significantly increased the operating and capital costs of the pilot plant alkylation unit.

Example 4: Injection of Additive into Ionic Liquid Stream Using a Transfer Drum and Injection Quill An integrated system with the design shown in FIG. 1 is constructed and used to feed the alkyl halide additive into n-butyl pyridinium chloroaluminate ionic liquid catalyst in the same pilot plant alkylation unit described earlier. A transfer drum is installed between the positive displacement pump and injection quills, and a stable pressure on the top of the transfer drum is supplied by a flow of nitrogen to the transfer drum. The immiscible liquid additive is added to the ionic liquid catalyst via injection quills and once the two liquids are thoroughly mixed in an in line static mixer, the liquid mixture is sent to a downstream alkylation reactor, wherein a hydrocarbon feed comprising isobutane and 2-butene is added to the liquid mixture.

Operating this integrated system provides the following advantages:

1. The additive flow to the ionic liquid stream remains constant, continuous, and reliable, which results in uniform additive concentration in the ionic liquid stream and excellent alkylate product quality in the downstream reaction system.

2. Even when the diaphragm pump occasionally stops pumping or fluctuates, due to the stable and elevated pressure in the transfer drum, the ionic liquid is completely prevented from flowing backwards into the additive addition lines. A check valve (other than those that may be been installed inside the diaphragm pump) is not needed to slow down or prevent the back flow of the ionic liquid. No contamination of the additive delivery system occurs.

3. No moisture breakthroughs occur, which prevents ionic liquid hydrolysis and reduces plugging of the injection quills and additive addition lines. There is no need to shut down the operation of the unit to clean up the additive addition lines or injection quills.

4. The high linear velocity of the additive stream through the injection quills provides excellent mixing of the immiscible additive and the ionic liquid streams, resulting in uniform additive concentration in the ionic liquid stream and excellent alkylate product quality in the downstream reaction system.

5. The high linear velocity of the additive stream through the injection quills prevents any solid particles that can be formed by the reactions between the additives and the ionic liquid from plugging up the injection quills.

6. When the additive flow rate needs to be reduced per downstream operation requirements, solvent is injected into the additive addition line and this maintains a high enough liquid speed at the tip of the injection quills to prevent plugging and maintain good operation of the unit.

7. When the additive addition system is flush cleaned by the solvent, the unit does not need to be opened up or disassembled.

8. Using two additive injection lines in parallel allows for one injection line to be operated in active mode and the other in standby mode, which provides more reliable continuous operation of the unit. The additive injection line in standby mode is quickly put into service when needed.

It is claimed:

1. An integrated system for continuously injecting an immiscible liquid stream that is a co-catalyst into a larger liquid stream that is an acidic ionic liquid catalyst, comprising:
   a. an additive delivery system comprising a transfer drum that continuously feeds the immiscible liquid stream towards one or more conical injection quills each having a single inlet with an orifice diameter from 0.05 mm to 5 mm that provides mixing of the immiscible liquid stream and the larger liquid stream;
   b. a solvent flushing system, fluidly connected downstream from the additive delivery system, comprising one or more additive addition lines that transfer the immiscible liquid stream from the additive delivery system to the one or more conical injection quills, and wherein a solvent is injected into the one or more additive addition lines;
   c. an additive injection and mixing system comprising the one or more conical injection quills, wherein the immiscible liquid stream is injected and mixed by the one or more conical injection quills into the larger liquid stream, and d. a downstream alkylation reactor connected to the additive injection and mixing system that receives a liquid mixture from step c) and produces an alkylate product.

2. The integrated system of claim 1, wherein the transfer drum has an inlet that introduces a gas that maintains a pressure in the transfer drum.

3. The integrated system of claim 1, wherein the additive delivery system additionally comprises a storage drum that is connected via a pump to the transfer drum.

4. The integrated system of claim 1, additionally comprising a flow controller that meters an amount of an additive that is fed from the additive delivery system towards the one or more conical injection quills.

5. The integrated system of claim 1, wherein the one or more conical injection quills are configured to provide an injection flow velocity of from 30 to 1000 mm/s.

6. The integrated system of claim 1, wherein the one or more conical injection quills comprise an outlet to a drain that allows for occasional flush cleaning with the solvent.

7. The integrated system of claim 1, wherein the one or more conical injection quills are seated in one or more tee connectors that feed the immiscible liquid stream into the larger liquid stream.

8. The integrated system of claim 1, wherein the one or more conical injection quills are sized to provide a ratio of a quantity, in liter/day, of an additive in the immiscible liquid stream to a second quantity, in liter/day, of the larger liquid stream, wherein the ratio of the quantity to the second quantity is from 0.001:1 to 0.1:1.

9. The integrated system of claim 1, wherein the one or more conical injection quills are oriented vertically and inject the immiscible liquid stream in a downward direction into a horizontal flow of the larger liquid stream, and wherein a density of the immiscible liquid stream is less than a second density of the larger liquid stream.

10. The integrated system of claim 1, comprising two or more additive addition lines in parallel.

11. The integrated system of claim 1, wherein the orifice diameter is less than 3 mm.

12. The integrated system of claim 1, wherein no further mixing of the immiscible liquid stream and the larger liquid stream is needed.

* * * * *